June 17, 1930.  E. J. BLOOM  1,764,774
LUBRICATING FIXTURE
Original Filed May 19, 1922  3 Sheets-Sheet 2
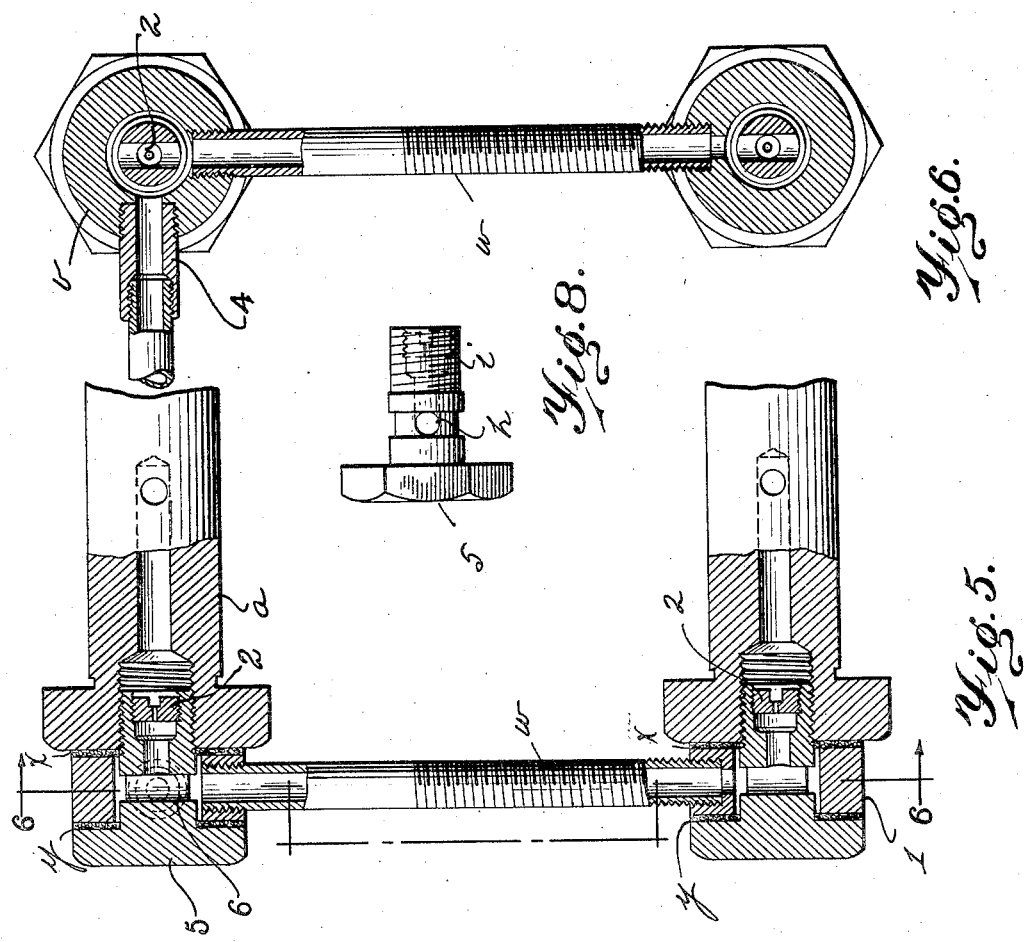
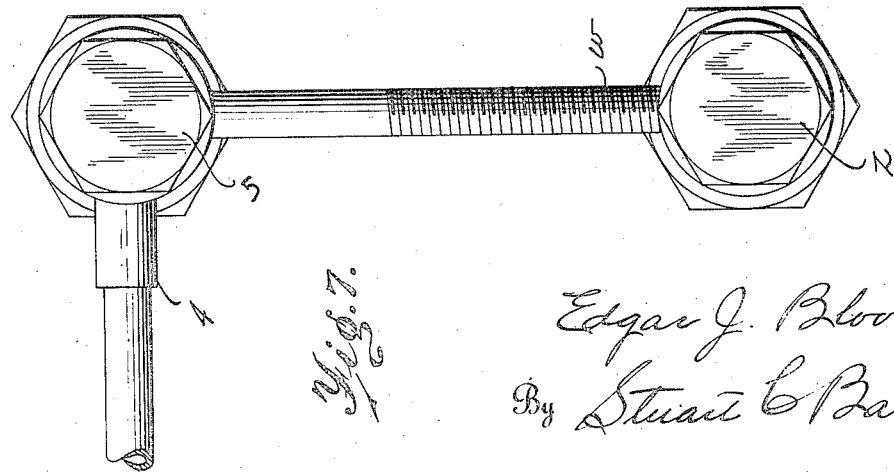
Inventor
Edgar J. Bloom
By Stuart C. Barnes
Attorney

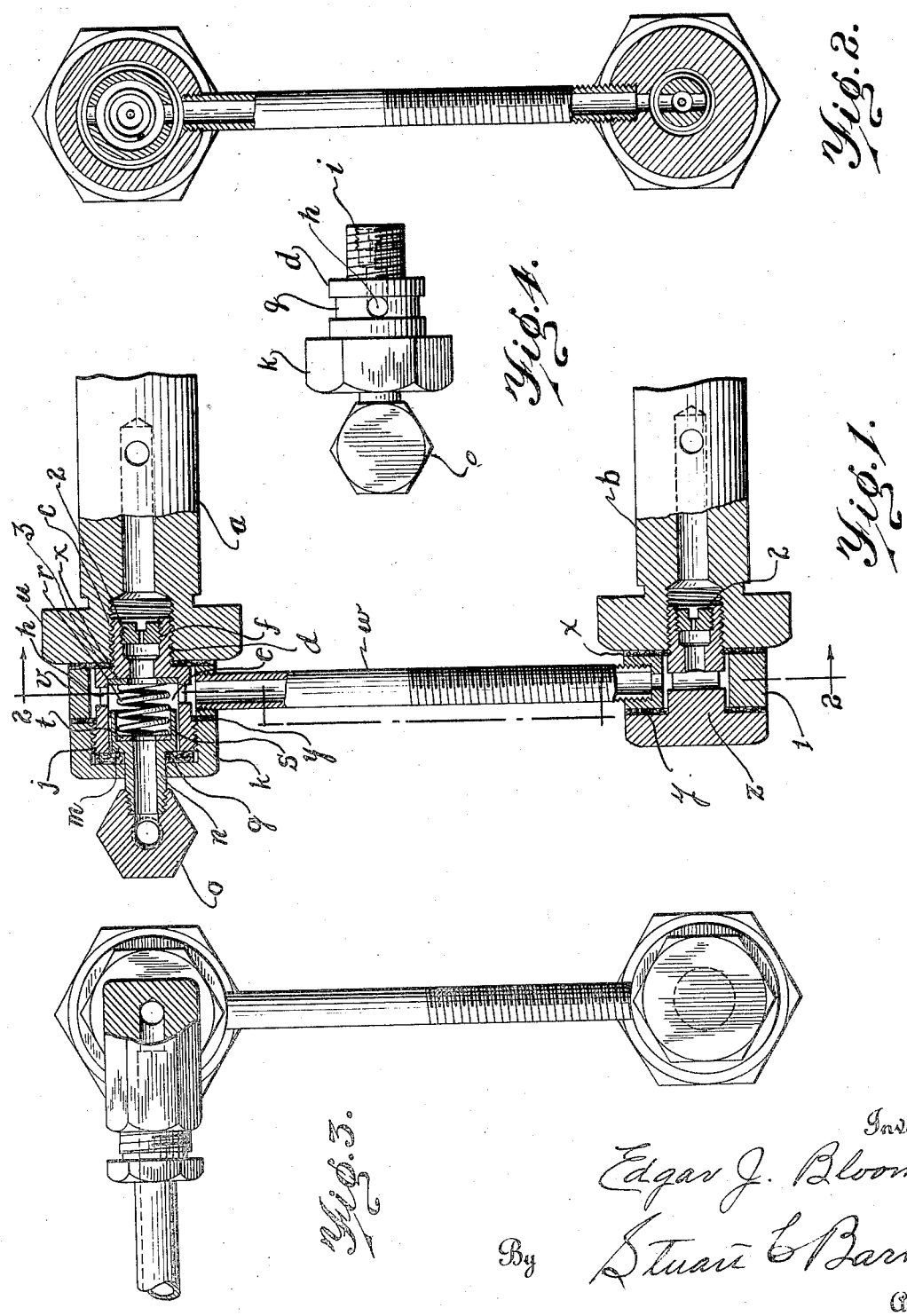

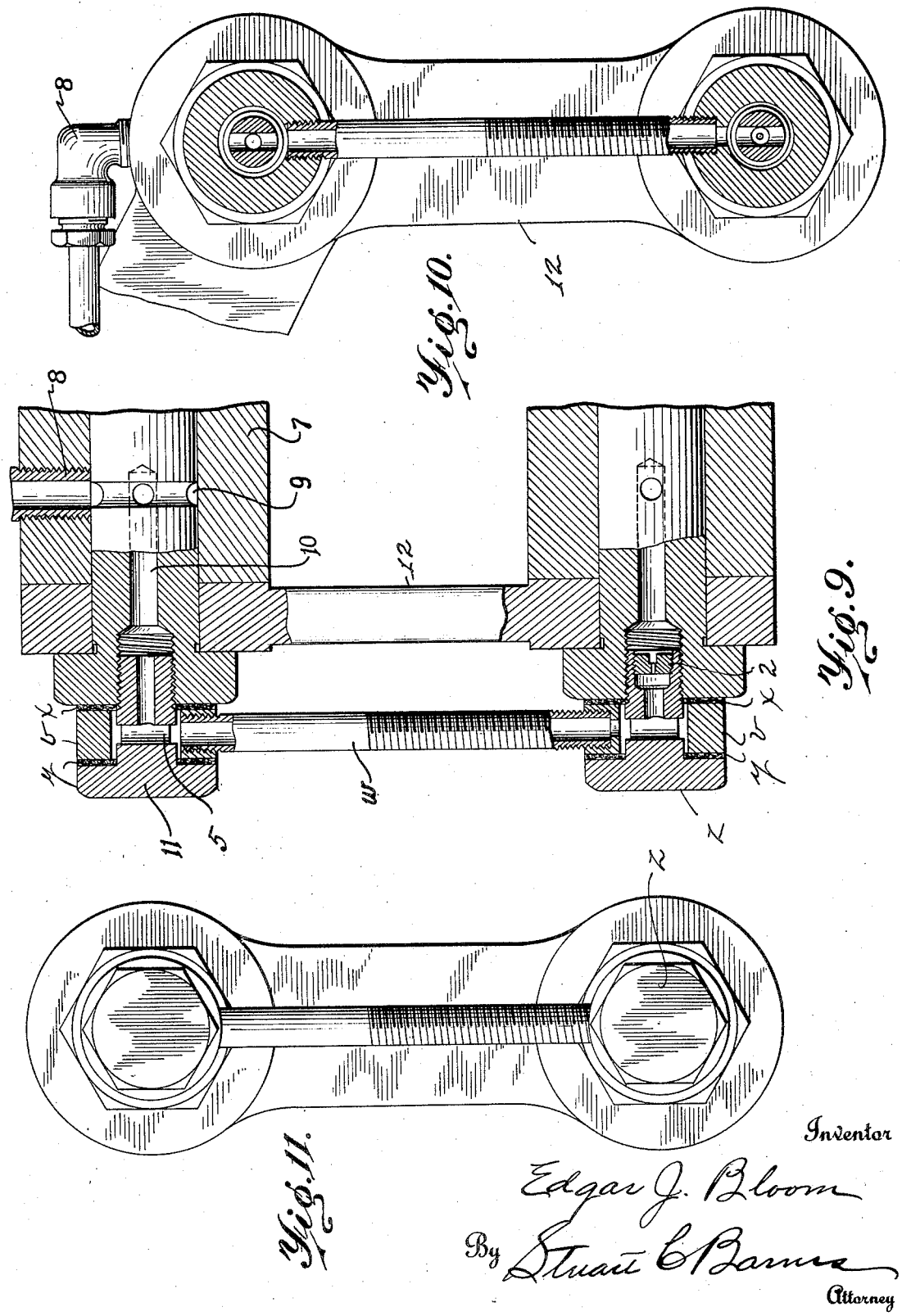

Patented June 17, 1930

1,764,774

UNITED STATES PATENT OFFICE

EDGAR J. BLOOM, OF TIFFIN, OHIO, ASSIGNOR, BY MESNE ASSIGNMENTS, TO AUTO RESEARCH CORPORATION, A CORPORATION OF DELAWARE

LUBRICATING FIXTURE

Application filed May 19, 1922, Serial No. 562,060. Renewed November 20, 1928.

This invention relates to a lubricating fixture for use in connection with lubricating systems used to distribute a lubricant from a single source to a plurality of bearings located, some of them, on parts which have relative movements with respect to the parts on which is located the source of lubricant. I have in mind in particular the lubrication of a chassis frame and running gear of an automobile from a single source. It is the object of the present invention to provide a suitable connection between the shackle bolts at the ends of the springs.

In the drawings:

Fig. 1 is a view largely in section of a portion of two shackle bolts showing the connecting fixture.

Fig. 2 is a section on line 2—2 of Fig. 1.

Fig. 3 is a side elevation taken from the left of Fig. 1.

Fig. 4 is a detail of the special stud and swivel which screws into the end of the shackle bolt.

Figs. 5, 6, 7 and 8 are similar views of a modified form of the same generic invention.

Figs. 9, 10 and 11 are similar views of a second modified form of the same generic invention.

Referring to Fig. 1: $a$ designates the upper shackle bolt, $b$ the lower shackle bolt. The upper shackle bolt ordinarily at the present time turns in the eye of a stationary member, which is either part of the chassis frame or else a permanent fixture. The end of this shackle bolt is bored and tapped as at $c$ to take a special stud $d$, as detailed in Fig. 4. This stud is a screw machine product, having a larger bore $e$ and a smaller bore $f$. On the outside it has an annular groove $g$ connected with a larger inner bore $e$ by port $h$. The inner end is of a reduced diameter and is externally threaded as at $i$. The outer end is of larger diameter and is threaded as at $j$. The cap nut $k$ is arranged to screw onto the exterior after the swivel plunger $m$ has been inserted in the bore of the larger diameter. This plunger is provided with a neck portion $n$ which screws into the hexagonal coupling $o$ on a pipe thread. The neck $n$, the plunger $m$ and the coupling $o$ form a swivel coupling.

A packing ring $q$ is inserted in between the cap nut $k$ and the top of the plunger $m$ and a coiled spring $r$ ordinarily forces the plunger $m$ up against this packing to make the same liquid tight. This spring $r$ is centered by engaging in the bored end $s$ of the plunger against a wear plate $t$.

Between the cap nut $k$ and the head $u$ of the shackle bolt is a ring $v$ provided with a port into which screws the hollow rod $w$. Fiber washers $x$ and $y$ engage between the cap nut, the ring, and the head of the bolt. By screwing the cap nut tightly against the fiber washers a liquid tight joint can be obtained. This hollow rod $w$ will oscillate slightly due to its connection with the lower shackle bolt $b$, which will always move slightly around the axis of the upper shackle bolt by reason of the two being connected together by shackles or links 12 (see Figs. 9 and 10). The lower end of the hollow rod $w$ screws into the ring $l$, which engages between the head of the stud $z$ and the head of the shackle bolt $b$ in precisely the same way as the ring $v$ at the other end is seated with this exception, that the stud $z$ has an integral head and requires no cap nut arrangement to house a portion of the swivel coupling. In each stud there is a screw plug 2 with a metered port. The size of drilling is calculated to feed the proper amount of oil to comport with the requirements of each shackle bolt. In the upper stud a wear plate 3 is provided between the chamber of larger bore $e$ and the chamber of the smaller bore $f$.

Two modified forms of the generic invention are shown in the remaining figures: In Figs. 5 to 8 inclusive, in place of a swivel coupling to connect with the source of a lubricant a rigid coupling is provided by the sleeve 4. Hence the stud 5 with a solid head may be used very similarly to the stud used in connection with the lower shackle bolt in the Figs. heretofore described.

In the modified form shown in Figs. 9 to 11 inclusive, the oil enters the spring eye 7, at the top through the elbow 8, it passes around the shackle bolt through the annular groove 9 into the interior of the shackle bolt through the passageway 10 into the stud 11, and thence through the hollow rod $w$ to the lower shackle bolt.

In a co-pending application No. 562,090, I have claimed and described the general system of lubrication of which this is a part. In that application it is stated that the main ordinarily contains oil and the passageway to each bearing is provided with a metered orifice which restrains the flow of oil and which permits the bearing by sucking action, through a relative movement of its parts and also by a capillary pull due to the presence of the fluid in the bearing, to draw the oil through the metered opening in accordance with the need of the bearings. It is stated also in that application that the proper feed is achieved by keeping the oil mains substantially air-tight so that the oil will not feed by gravity.

What I claim is:

1. In a lubricating system for the purpose specified, the combination of a pair of shackle bolts, means for furnishing lubricant to one bolt, a stud fitting into the end of each bolt and arranged for the passage of the lubricant, and a connector between the studs for conveying the lubricant from one stud to the other, said connector having ring-like terminals fitted over said studs in liquid-tight relation.

2. In a lubricating system for the purpose specified, the combination of a pair of shackle bolts, a headed stud fitting into the end of each bolt and having a passageway for the flow of lubricant, a ring packed in between the head of each stud and the bolt head and a hollow rod connector between the rings for conveying a lubricant from one stud to the other.

3. In a lubricating system for the purpose specified, the combination of a pair of bolts, means for supplying lubricant to one bolt, a headed stud screwing into the end of each bolt and having a passageway for the flow of oil or fluid, a ring between the head of each bolt and the head of each stud, packing rings between such ring and the two heads, and an adjustable connecting rod screwing into the two rings for furnishing a fluid conveyor from one stud to the other.

4. In a lubricating system for the purpose specified, the combination of a pair of bolts, a stud fitting into the end of each bolt and provided with oil passageways and a hollow connecting member having terminals movably supported on such studs and packed to form a liquid tight connection about the studs and arranged for conveying oil directly from one bolt to the other.

5. In a lubricating system for the purpose specified, the combination of a pair of bolts, a stud screwing into each bolt, one of the studs provided with a swivel chamber, a swivel coupling having a part located in the swivel chamber of such stud, a cap screwing onto the stud for holding the swivel coupling part in such stud and a connecting member between the studs and in packed relation with the studs to convey lubricant from one stud to the other.

6. In a lubricating system, the combination of a pair of bolts, a stud fitting into the end of each bolt, one stud provided with a bore of two different diameters, one of the larger diameter forming a swivel chamber, a swivel plunger engaging in such swivel chamber, a cap nut screwing on to such stud for holding swivel plunger in such chamber, rings mounted to rock and a connecting member between the studs comprising a hollow rod adjustably fitting into the rings which are in a packed relation with respect to the studs and which functions to convey lubricant from one stud to the other.

7. The combination of a pair of bolts each having a conduit connecting its side wall with one of its ends, a stud fitting into said end of each bolt and having a conduit communicating with the conduit therein, a member having a conduit therein communicating with the conduits in said studs, and a ring having packing at its opposite sides mounted on each stud and connecting an end of said member thereto, said rings being clamped between the ends of said bolts and portions of said studs and sealing the joints between the same.

8. The combination of a pair of bolts each provided with a conduit connecting its side with one of its ends, a stud disposed in said end of each bolt and provided with a conduit communicating with the conduit therein, a member having a conduit therein communicating with the conduits in said studs, and a ring interposed between packing members and clamped on each stud and connecting the adjacent end of said member with the respective stud.

In testimony whereof I affix my signature.

EDGAR J. BLOOM.